Figure 1:
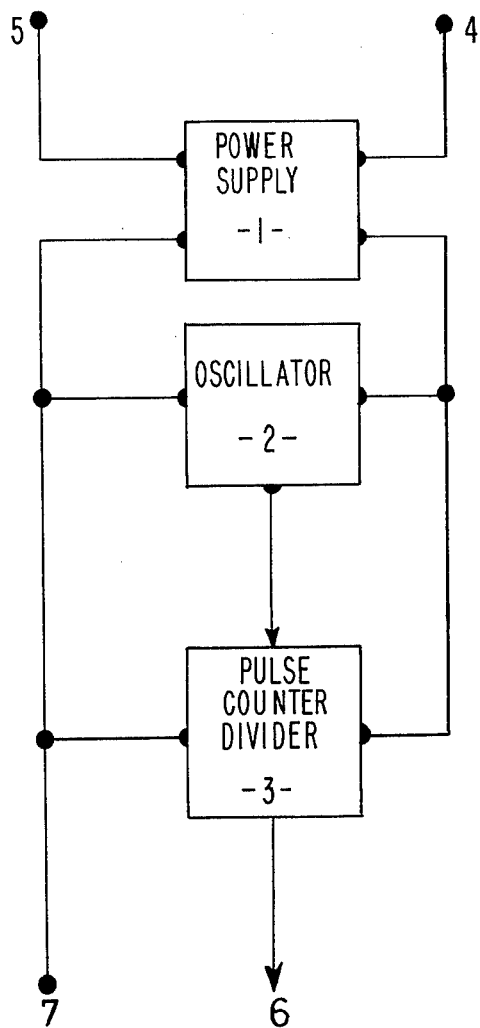

United States Patent [19]

De Avila-Serafin et al.

[11] 4,008,415
[45] Feb. 15, 1977

[54] PHOTOCONTROL FOR ELECTRIC LAMPS

[75] Inventors: Antonio De Avila-Serafin; Francisco Javier Diaz-Romo, both of Guadalajara, Mexico

[73] Assignee: Electrotec de Occidente, S.A., Guadalajara, Mexico

[22] Filed: Dec. 11, 1974

[21] Appl. No.: 531,835

[30] Foreign Application Priority Data

Dec. 14, 1973 Mexico .................... 148214

[52] U.S. Cl. .................... 315/156; 315/157; 315/159; 315/360
[51] Int. Cl.² .................... H05B 39/02
[58] Field of Search .................... 315/360, 149–159

[56] References Cited

UNITED STATES PATENTS

| | | | |
|---|---|---|---|
| 2,140,387 | 12/1938 | Juchter | 315/159 |
| 2,295,894 | 9/1942 | Dewan | 315/360 |
| 3,366,801 | 1/1968 | Rulseh | 315/360 |
| 3,450,939 | 6/1969 | Misencik | 315/159 |
| 3,539,861 | 11/1970 | Blackford | 315/159 |
| 3,611,432 | 10/1971 | Babcock | 315/360 |
| 3,648,107 | 3/1972 | Rydborn | 315/360 |

*Primary Examiner*—John Kominski
*Attorney, Agent, or Firm*—Ladas, Parry, Von Gehr, Goldsmith & Deschamps

[57] ABSTRACT

An improved photocontrol system for electrical lamps comprising the combination of photoelectric means responsive to the intensity of the ambient light for controlling the turning the lamps on and off, and an electronic timer for turning off the lamps at a preset time interval, after they have been turned on.

5 Claims, 5 Drawing Figures

PHOTOCONTROL FOR ELECTRIC LAMPS

This invention relates to an improved photocontrol system of the type used to control automatically the turning on and off of electric lights at sunset and sunrise.

A serious limitation of ordinary photocontrol systems now available is that they keep lamps burning all night (an average of 12 hours per day) with the consequent waste of energy.

The object of the present invention is to provide an improved photocontrol system having an electric timer incorporated therewith, adapted to turn off the lamps after a programmed time lapse, hours in advance of sunrise, when they are less necessary or not necessary at all, thus saving energy and life hours of the lamps.

To provide an example of how convenient and money saving such a device could be, consider a big city where a photocontrol system with time delay is installed (One for each two street lamps). After midnight one of each two lamps would turn off, leaving still half the lamps of the city lit until sunrise. This situation obviously does not endanger the public and saves hundreds of millions of watts per night in one big city alone.

Billboards, big light displays, shop windows, etc. would also benefit from use of such a photocontrol system, to turn them on at dusk and turn them off after a programmed time period.

The prior art photocontrol systems cannot accomplish this task and electromechanical clocks leave much to be desired.

The main disadvantage of electromechanical clocks are:
1. They always switch the lights at predetermined times, regardless of changes in the time of sundown due to changes in the seasons.
2. Errors introduced by blackouts or fluctuations of frequency and or voltage in the mains are cumulative.

The electronic timer for the improved photocontrol system is not affected by frequency variations, it is not affected by variations up to 20 percent of the nominal voltage, and since it always starts its programmed counting from zero every time the lamps are lit it cannot accumulate errors of time due to interruptions of energy.

The present invention creates a new type of photocontrol devise by incorporating in the same unit, and for the first time, a photocontrol and an electronic timer.

The functions of the photocontrol means are:
a. To maintain the lamps turned off as long as there is sufficient sunlight.
b. To turn on the lamps and the electronic timer when the ambient light drops below a predetermined level.

The functions of the timer are:
a. To reset and start counting from zero every time the lamps are turned on.
b. To turn the lamps off after a preset time lapse. There are numerous possibilities for different circuit designs. There are presented here three examples to show how to incorporate an electronic timer in three of the most usual types of photocontrol systems, namely:
1. A photocontrol system having an electromagnetic relay.
2. A photocontrol system having a bimetallic heat responsive relay (Thermostat).
3. A solid state photocontrol system having a solid state relay.

Figure 2:
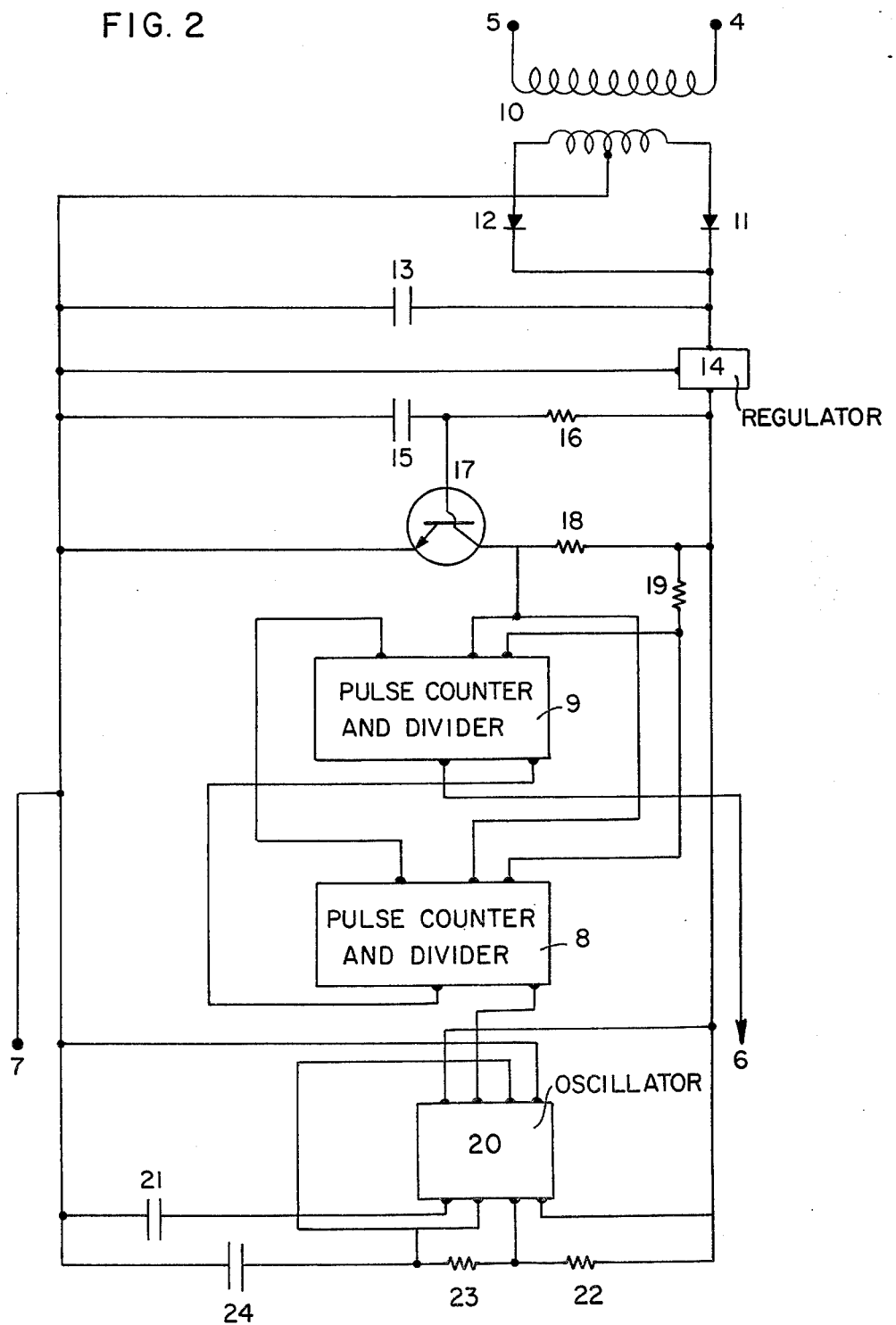
Figure 3:
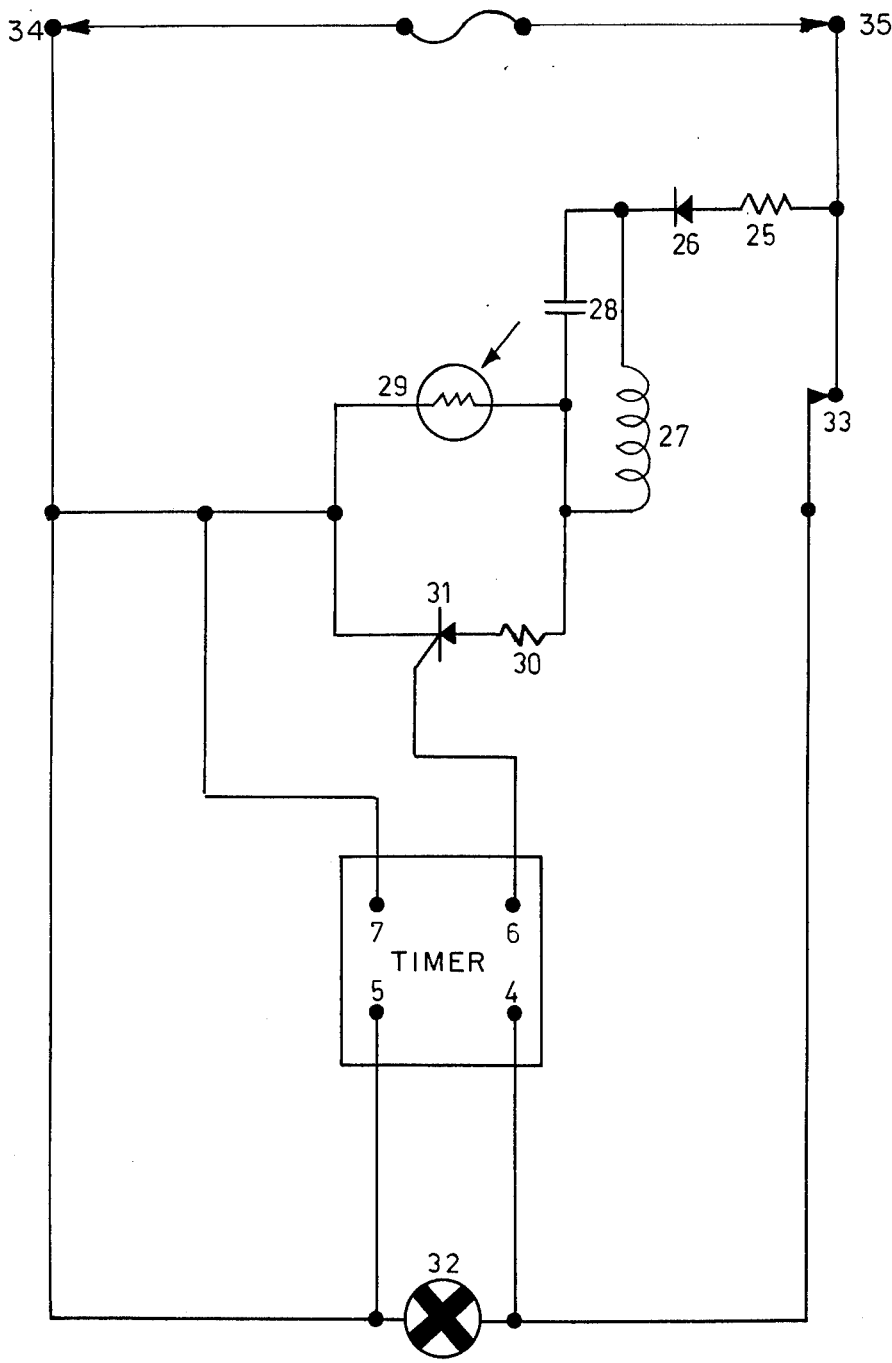
Figure 4:
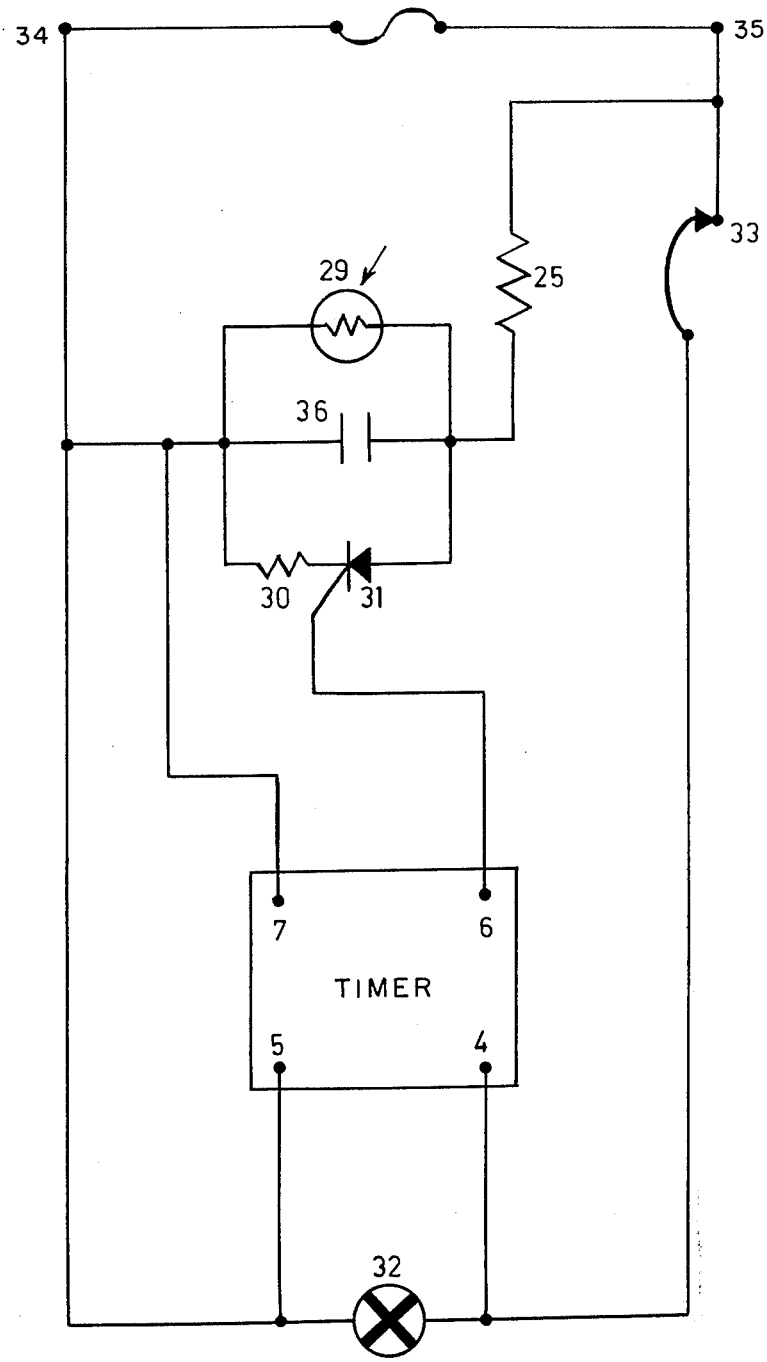
Figure 5:
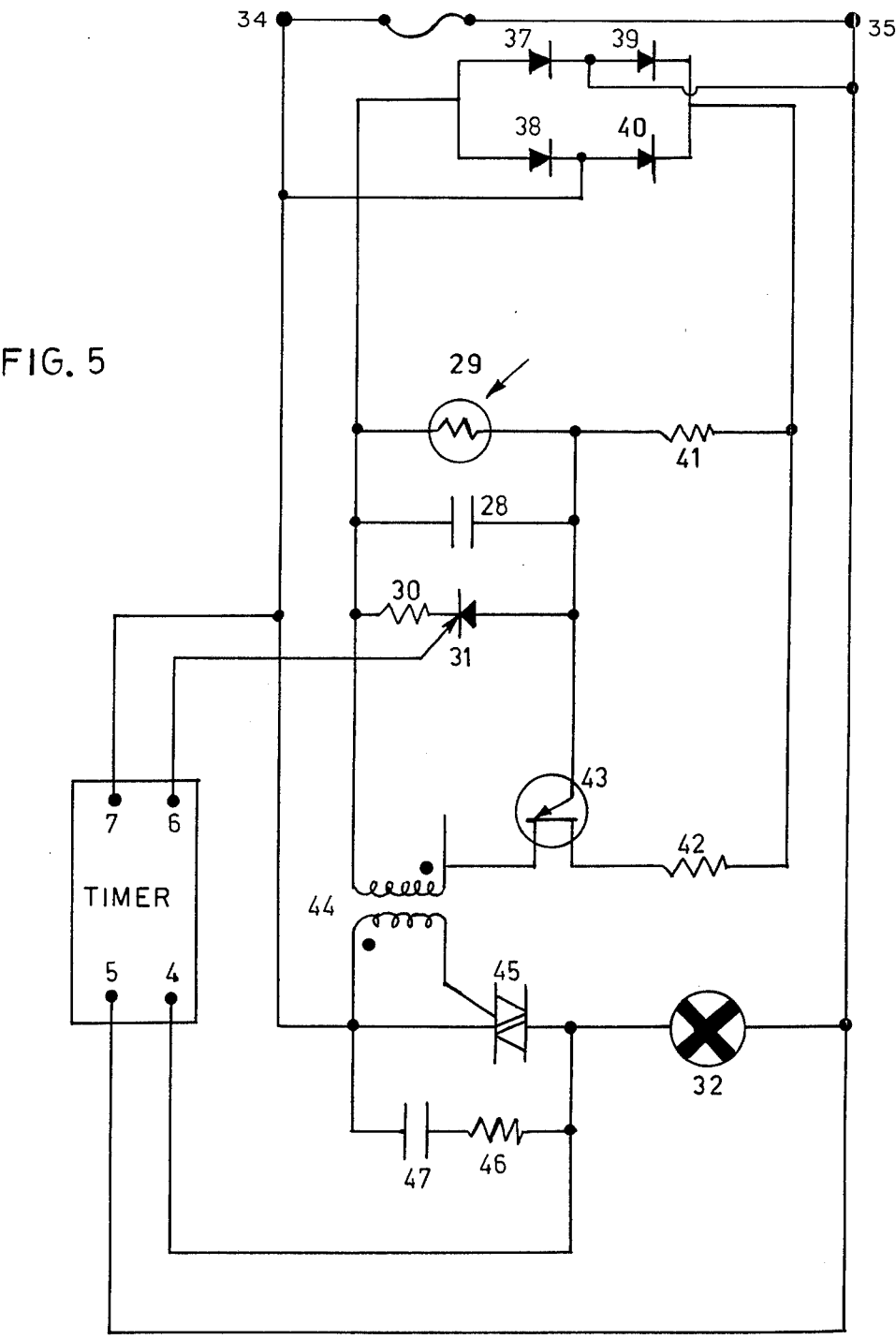

The invention will now be described with reference to the accompanying drawings, in which FIGS. 1 and 2 illustrate the timer, and FIGS. 3 to 5 illustrate the alternative systems referred to above.

Referring to FIG. 1, the timer consists of a D.C. power supply 1 having A.C. voltage input terminals 4 and 5, an oscillator 2 and a pulse counter-divider circuit 3. Lead 6 is the timer's signal output and lead 7 is the "common" or "ground" lead of the circuit.

Referring to the circuit shown in FIG. 2, when the load (Lamp) is turned on, A.C. voltage is also applied to the terminals 4 and 5 of transformer 10. The secondary of transformer 10 delivers low A.C. voltage to a full wave rectifier comprising diodes 11 and 12. The resulting D.C. voltage is filtered by capacitor 13 and regulated by an I.C. network 14 (circuit pack LM-309-H of Signetics Corp.). In alternative circuits, there could be eliminated both the transformer 10 (replacing it by a voltage divider network) as well as the voltage regulator. D.C. voltage is applied to pulse counters 8 and 9 (each comprising circuit pack SN-7490 of Signetics Corp.), a reset/count network comprising the elements 15, 16, 17, 18 and 19, and an integrated circuit 20 (circuit pack NE-555 of Signetics Corp.). The counters 8 and 9 are reset to zero by the momentary conduction of transistor 17. At the same time the oscillator constituted by the combination of the circuit 20 and the elements 21, 22, 23 and 24 starts generating square wave pulses and sending them to the pulse counter/divider network 8, the frequency of these pulses being determined by the network formed by elements 21, 22, 23 and 24.

Fixed resistor network (22), (23), can be replaced by a temperature dependent resistor network, using a thermistor in combination with one or several fixed resistors, or two thermistors and several fixed resistors the purpose of this being to change the frequency of the oscillator as a function of the temperature, making it slower in cold weather as in winter, and faster when the weather is warmer as in summer. In this way the on state will be made shorter in summer when the sun sets later and nights are shorter and longer in winter when the sun sets earlier and nights are longer.

The counter 8, which is an integrated circuit, has a limited capacity to count pulses. When this limit is reached a square wave pulse is sent from the counter 8 to the counter 9, which is also an Integrated Circuit. The counter 8 resets to zero and is ready to start counting again.

The counter 9 has a limited capacity to count also. When this capacity is reached the counter 9 sends a pulse through output 6 of the timer. This is the "off" signal.

This chain of pulse counters (or cascading counters) can be made longer, depending on the total time desired to elapse between the turning on of the external load (Lamps) and the "off" signal coming out from the last counter in the chain, and depending on the frequency of the oscillator 20 and its network 21, 22, 23, and 24. The turn off signal consists of the first square wave generated by the last counter divider in this chain. This signal is sent through terminal 6 to the gate of the controlled semiconductor 31, shown in FIGS. 3, 4 and 5.

The complete timer can be contained in a single element (integrated circuit) or can be assembled with discrete components or any other combination of Integrated Circuits and discrete components.

Referring to FIG. 3, in the electromechanical, relay operated, photocontrol system light falling upon the photocell 29 during daytime makes it become highly conductive thus permitting enough current to flow through coil 27 of the relay forcing it to maintain the contacts 33 electrically open.

Darkness after sunset makes photocell 29 highly resistive. Current through coil 27 drops, and relaxes the electromagnetic force that maintained contacts 33 open.

At this point lamp 32 is lit, the timer turns on, resets to zero and starts counting its programmed time lapse.

After the preselected time period the timer sends the "off" signal to controlled semiconductor 31 making it conduct electrically bypassing photocell 29, which is still highly resistive due to darkness.

When controlled semiconductor 31 becomes conductive, current flows through coil 27 and forces the contacts 33 to open, thus turning off the lamp 32 and the timer.

At sunrise, the electrical resistance of photocell 29 drops below the value of resistor 30 thus depriving semiconductor 31 of the necessary "holding current" and 31 is turned off. It is now the function of photoelectric cell 29 to keep conducting enough current through coil 27 to maintain contacts 33 open during the day.

Resistor 25 limits voltage and current through the photoelectric network.

Diode 26 and capacitor 28 provides filtered D.C. voltage to semiconductor 31, necessary to maintain its conductive state after it is triggered by the "off" signal of the timer.

Referring to FIG. 4, in the bimetallic relay operated photocontrol system the theory of operation is similar to that of FIG. 3, except that coil 27 of FIG. 3 is replaced by a heating resistor 25 and contacts 33 are forced to open not by electromagnetism, but by the curving effect of the different expansion factors of the bimetallic relay, affected by the heat released by resistor 25.

Capacitor 36 provides current to semiconductor 31 during the negative half cycles to maintain it conducting after it is triggered by the "off" signal of the timer.

Referring to FIG. 5, in the solid state relay, photocontrol system, photocell 29 draws voltage from the gate of transistor 43 and thus inhibits its firing during daytime.

After dusk, high resistivity in photocell 29 permits enough voltage to be delivered to the gate of 43, firing it and subsequently semiconductor relay 45 is also triggered. When solid state relay is changed to the conductive state the lamp load is lit and the timer is started.

When the desired "on" time is reached, the timer sends the "off" signal to gate of semiconductor 31 making it conductive and depriving transistor 43 of the necessary voltage to keep it on. This action also turns solid state relay 45 and the load off. In daytime, photocell 29 becomes highly conductive and deprives semiconductor 31 of the necessary holding current so it turns off. Photoelectric cell 29 keeps draining voltage as long as there is sufficient light, inhibiting the excitation of the gate of the solid state relay 45, thus keeping the lamp and the timer off. Diodes 37, 38, 39 and 40 forms a full wave rectifier bridge network. Fixed resistor 41 and photoresistor 29 form a light dependent voltage divider network.

The triggering circuit for the solid state relay 45 is formed by resistor 42, transistor 43 and pulse transformer 44. Resistor 46 and capacitor 47 damp the transient voltage peaks on the supply line. In the case of this solid state photocontrol system, the state of the art permits all the circuitry, or part of it, to be formed on a single chip of an integrated circuit.

We claim:
1. A photocontrol system, comprising:
 a. circuit means having power supply terminals for connection with a source of electrical energy and load terminals for connection with an electrical load;
 b. switch means connected in the circuit means to control supply of current to the load terminals;
 c. electrical means controlling operation of said switch means;
 d. solid state electronic timer means connected between the load terminals and comprising a pulse generator which generates pulses at a predetermined frequency, beginning when current is supplied to the load terminals, and counting means which count the pulses generated by the pulse generator and provide an output signal when a preset count has been reached after beginning counting;
 e. control means connected to respond to said output signal by causing said electrical means to bring about opening of the switch means; and
 f. photoelectric means respective to the intensity of ambient light to cause the electrical means to maintain the switch means open independently of said control means until the level of ambient light falls below a predetermined level, whereby when said power supply terminals are connected with a source of electrical energy and the intensity of ambient light falls below said predetermined level, said photoelectric means automatically cause said switch means to close and remain closed until said preset count is reached or the intensity of ambient light once more reaches said predetermined level, which ever is sooner, whereupon said switch means are automatically opened and remain open until the intensity of ambient light falls once more below said predetermined level.

2. A system as claimed in claim 1, wherein the control means comprises a controllable semiconductor device and the photoelectric means comprises a resistive member connected in parallel with the controllable semiconductor device, the resistance of the resistive member falling to a low level when the level of ambient light reaches a high level so as to deprive the controllable semiconductor device of holding current.

3. A system according to claim 1 in which the electrical means is an electromagnetic relay.

4. A system according to claim 1 in which the electrical means is a bimetallic heat responsive relay.

5. A system according to claim 1 in which the electrical means is a solid state relay.

* * * * *